(12) United States Patent
Huang et al.

(10) Patent No.: US 11,577,463 B2
(45) Date of Patent: Feb. 14, 2023

(54) PATTERNS ON OBJECTS IN ADDITIVE MANUFACTURING

(71) Applicant: Hewlett-Packard Development Company, L.P., Spring, TX (US)

(72) Inventors: Wei Huang, Palo Alto, CA (US); Gary J. Dispoto, Palo Alto, CA (US); Craig Peter Sayers, Palo Alto, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/256,691

(22) PCT Filed: Mar. 15, 2019

(86) PCT No.: PCT/US2019/022482
§ 371 (c)(1),
(2) Date: Dec. 29, 2020

(87) PCT Pub. No.: WO2020/190260
PCT Pub. Date: Sep. 24, 2020

(65) Prior Publication Data
US 2021/0394445 A1 Dec. 23, 2021

(51) Int. Cl.
*B29C 64/386* (2017.01)
*B33Y 50/00* (2015.01)
*G05B 19/4099* (2006.01)

(52) U.S. Cl.
CPC ............ *B29C 64/386* (2017.08); *B33Y 50/00* (2014.12); *G05B 19/4099* (2013.01); *G05B 2219/35012* (2013.01); *G05B 2219/45028* (2013.01)

(58) Field of Classification Search
CPC ... B29C 64/386; B29C 64/165; B29C 64/393; B33Y 50/00; B33Y 50/02; B33Y 10/00;
(Continued)

(56) References Cited

U.S. PATENT DOCUMENTS 6,306,319 B1 10/2001 Swain et al.
6,904,243 B2 6/2005 Smith et al.
(Continued)

FOREIGN PATENT DOCUMENTS

JP 2017530881 A * 10/2017
WO WO-2016010590 A1 1/2016
(Continued)

*Primary Examiner* — Chad G Erdman
(74) *Attorney, Agent, or Firm* — Shook, Hardy & Bacon L.L.P.

(57) ABSTRACT

In an example, a method includes operating, by a processor, on object model data and operating, on a processor, on pattern data. The object model data describes at least part of an object to be generated in additive manufacturing and the pattern data describes an object pattern intended to be formed on at least a portion of the part of the object to be generated in additive manufacturing. The method includes determining, by a processor, control data to control a print agent applicator to apply a pattern of fusing agent onto a part of a layer of build material. The pattern of fusing agent comprises a fusing agent area and a gap area that lacks fusing agent. The gap area corresponds to the object pattern such that no fusing agent is applied to a part of the layer of build material that corresponds to the object pattern.

16 Claims, 5 Drawing Sheets

(58) Field of Classification Search
CPC ...... G05B 19/4099; G05B 2219/35012; G05B 2219/45028
See application file for complete search history.

(56) References Cited

U.S. PATENT DOCUMENTS

| | | |
|---|---|---|
| 6,989,065 B2 | 1/2006 | Tabor et al. |
| 7,678,317 B2 | 3/2010 | Khouri et al. |
| 10,060,099 B2 | 8/2018 | Serrurier et al. |
| 2007/0183918 A1 | 8/2007 | Monsheimer et al. |
| 2007/0241482 A1 | 10/2007 | Giller et al. |
| 2015/0125334 A1 | 5/2015 | Uetani et al. |
| 2015/0352639 A1 | 12/2015 | Toyserkani et al. |
| 2016/0082537 A1* | 3/2016 | Weber ............... B23K 11/11 219/121.2 |
| 2016/0260001 A1* | 9/2016 | Flores ............... G06K 1/121 |
| 2016/0374431 A1* | 12/2016 | Tow ............... A43D 1/022 36/43 |
| 2017/0232677 A1 | 8/2017 | Emamjomeh et al. |
| 2017/0246807 A1 | 8/2017 | Emamjomeh et al. |
| 2017/0297106 A1 | 10/2017 | Myerberg et al. |
| 2018/0015663 A1 | 1/2018 | Zhao et al. |
| 2018/0065297 A1 | 3/2018 | Zhao et al. |
| 2018/0147670 A1* | 5/2018 | Wiggins ............... B23K 26/342 |
| 2018/0319086 A1* | 11/2018 | Klammer ............. B29C 64/386 |

FOREIGN PATENT DOCUMENTS

| | | | |
|---|---|---|---|
| WO | WO-2017188966 A1 | 11/2017 | |
| WO | WO-2017196346 A1 * | 11/2017 | ........... B29C 64/165 |
| WO | WO-2018017084 A1 | 1/2018 | |

* cited by examiner

PATTERNS ON OBJECTS IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected sub-regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In an example, a suitable fusing agent may be an ink-type formulation comprising carbon black, such as, for example, the fusing agent formulation commercially known as V1Q60Q "HP fusing agent" available from HP Inc. In some examples, a fusing agent may comprise at least one of an infra-red light absorber, a near infra-red light absorber, a visible light absorber and a UV light absorber. Examples of print agents comprising visible light enhancers are dye based colored ink and pigment based colored ink, such as inks commercially known as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object and/or being printed, and/or detailing agent may in other examples be used in part areas to avoid over-fusion (for example when such areas are large). According to one example, a suitable detailing agent may be a formulation commercially known as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object, and in some examples properties such as color, strength, density and the like. To generate a three-dimensional object from the model using an additive manufacturing system, the model data may in some examples be processed to generate slices of parallel planes of the model. Each slice may define a portion of a respective layer of build material that is to be solidified or caused to coalesce by the additive manufacturing system.

Figure 1:
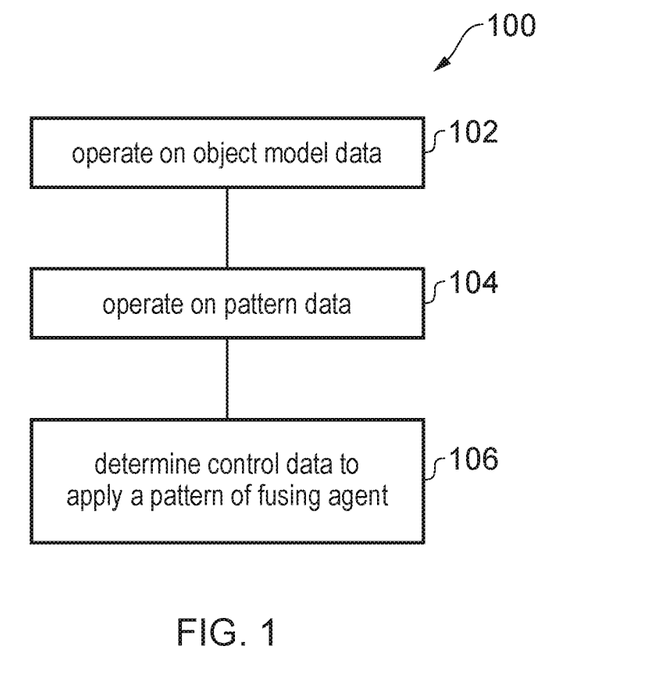
FIG. 1 is a flowchart of an example method of generating an object.

FIG. 1 is an example of a method, which may comprise a computer implemented method, and/or which may comprise a method of determining object generation instructions for generating at least part of an object by additive manufacturing and/or may comprise a method for generating an object (e.g. a three-dimensional object) by additive manufacturing. The method comprises, in block 102, operating, by a processor, on object model data, the object model data describing at least part of an object to be generated in additive manufacturing.

The object model data may comprise data representing at least a portion of an object to be generated by an additive manufacturing apparatus by fusing a build material. The object model data may for example comprise a Computer Aided Design (CAD) model, and/or may for example comprise a STereoLithographic (STL) data file, and/or may be derived therefrom. In some examples, the data may be received over a network, or received from a local memory or the like. In some examples, the data may define the shape of the part of an object, i.e. its geometry. In some examples, the data may define an appearance property, for example at least one intended colour, pattern, translucency, gloss or the like. In some examples the data may define at least one mechanical property, for example strength, density, resilience or the like. In some examples, the data may define at least one functional property, for example, conductivity in at least one object portion. Such properties may be associated with regions of the object, for example a color may be defined at an object surface.

In some examples, the object may be defined in terms of sub-volumes, each of which represents a region of the object which is individually addressable in object generation. In some examples herein, the sub-volumes may be referred to as voxels, i.e. three-dimensional pixels, wherein each voxel occupies or represents a discrete volume. In some examples of additive manufacturing, three-dimensional space may be characterised in terms of such voxels. In some examples, the voxels are determined bearing in mind the print resolution of an object generation apparatus, such that each voxel represents a region which may be uniquely addressed when applying print agents, and therefore the properties of one voxel may vary from those of neighbouring voxel(s). In other words, a voxel may correspond to a volume which can be individually addressed by an object generation apparatus (which may be a particular object generation apparatus, or a class of object generation apparatus, or the like) such that the properties thereof can be determined at least substantially independently of the properties of other voxels. For example, the 'height' of a voxel may correspond to the height of a layer of build material. In some examples, the resolution of an object generation apparatus may exceed the resolution of a voxel. In general, the voxels of an object model may each have the same shape (for example, cuboid or tetrahedral), but they may in principle differ in shape. In some examples, voxels are cuboids having the height of a layer of build material. In some examples, in processing object model data representing an object, each voxel may be associated with properties, and/or object generation instructions, which apply to the voxel as a whole.

In other examples, the object may be described in some other way, for example using a vector or polygon mesh based model. In some such examples, a voxel model may be derived from another model type.

In some examples, the method of FIG. 1 may be carried out on a slice by slice basis. In some examples, each slice may correspond to a layer to be generated in a layer-by-layer additive manufacturing process. In some examples, such slices may be slices of a virtual build volume modelling an intended 'real' build volume, and may comprise slices taken from more than one object model. In some examples, the slices may be one voxel thick.

The method 100 comprises, at block 104, operating, by a processor, on pattern data. The pattern data describes an object pattern intended to be formed on at least a portion of the part of the object to be generated in additive manufacturing. The object pattern is intended to be formed on at least a portion of the part of the object described by the object model data, operated on at block 102. As will be described with reference to some examples below, the object pattern described by the pattern data may comprise an identification code, text, logo, graphic, picture, wear indicator, or any combination thereof. As will also be described with reference to some examples below, the object pattern may be intended to be formed on at least an exterior surface, or boundary, of the object to be generated in additive manufacturing. For example, the portion of the object to be generated in additive manufacturing on which the object pattern is intended to be formed may comprise a slice of the object on an exterior surface, or boundary, of the object. In other examples, the object pattern may be intended to be formed on at least an internal region of the object to be generated in additive manufacturing. For example, the portion of the object to be generated in additive manufacturing on which the object pattern is intended to be formed may comprise a slice of the object on an interior of the object (e.g. on an internal region thereof).

Therefore, according to one example, the pattern data describes an object pattern intended to be formed on an external surface of the object, and the control data is to control the print agent applicator to apply the pattern of fusing agent onto a part of a layer of build material corresponding to an external surface of the object.

In one example, block 104 may generate pattern data based on a size (e.g. an area) of the object pattern. For example, block 104 may comprise generating the pattern data so as to produce the intended object pattern, but may create the pattern data so that the size of the build material which will correspond to the object pattern is sufficient to be able to be fused by the thermal bleed from parts of the build material to which fusing agent was applied (when energy is applied to these parts). In another example, block 104 may comprise receiving pattern data and modifying the received pattern data to adjust the size of the gap area such that the gap area will be fused by thermal bleed. In some examples this may involve reducing or shrinking the object pattern. Therefore, these examples prevent instances where the gap area is too large such that the thermal bleed from the fusing agent area is not sufficient to fuse all of the gap area. Accordingly, block 104 may comprise generating pattern data based on the size of the object pattern, or modifying the pattern data to ensure that the gap area will be fused by thermal bleed. In one example the method may comprise analysing the object pattern to determine a size of the gap area required to produce the object pattern in the object (e.g. comparing the object pattern to an acceptable size threshold). In this example the method may further comprise modifying the size of the gap area so that the object pattern may be reproduced, for example if the size threshold is exceeded (e.g. so that the gap area will sufficiently fuse by the thermal bleed).

According to another example, the pattern data describes an object pattern intended to be formed on at least an internal portion of the object, and the control data is to control the print agent applicator to apply the pattern of fusing agent onto a part of a layer of build material corresponding to an internal portion of the object. In this example, the object pattern described by the pattern data may comprise a wear indicator, for example, a pattern intended to be formed on an interior of the object indicating wear (e.g. due to abrasion, erosion, or other physical interactions etc.) to that object. The pattern data may therefore describe a wear indicator. For example, once the object has worn sufficiently to expose enough of a wear indicator this may indicate that the object needs replacement. In such examples, the pattern data may describe an object pattern intended to be formed on at first part of a first slice of the object, the first part being an internal portion of the object and a second part of a second slice of the object, the second part being an internal portion of the object, and the control data may be to control the print agent applicator to apply the pattern of fusing agent onto a part of a layer of build material corresponding to an internal portion of the object. Therefore, the object pattern may be intended to be formed on at least two slices of the object, e.g. may span two slices. For example, the object pattern may describe a first sub-pattern and a second sub-pattern. In one example, the first sub-pattern may be intended to be formed on a first slice of the object and the second sub-pattern may be intended to be formed on a second slice of the object. In another example, the first and second sub-patterns may each intended to be formed on first and second slices of the object. In examples where the object pattern describes a wear indicator the sub-patterns may be, for example, patterns of different area such as concentric circles. Therefore, the object pattern described by the pattern data may be intended to be formed in a single slice of the object, or may span multiple slices of the object. In each case, the fusing agent may be applied according to the pattern on a single layer of build material or multiple slices of build material, respectively.

The method 100 comprises, at block 106, determining, by a processor, control data to control a print agent applicator to apply a pattern of fusing agent (FA) onto a part of a layer of build material. The pattern of fusing agent comprises a fusing agent area and a gap area that lacks fusing agent. The gap area corresponds to the object pattern such that no fusing agent is applied to a part of the layer of build material that corresponds to the object pattern.

Therefore, the control data is to apply a pattern of fusing agent such that no fusing agent is applied to areas of build material corresponding to the pattern, but fusing agent is applied to areas of build material that do not correspond to the pattern. In this way, when energy (e.g. heat) is applied to the layer of build material to heat and fuse part of the layer, the parts of the layer to which fusing agent is applied (e.g. the fusing agent area of the pattern) will fuse, and the parts of build material to which no fusing agent is applied (e.g. the gap area of the pattern) will sinter (for example, fuse and/or melt) by thermal bleeding from the surrounding areas of build material comprising fusing agent. In other words, in this example, heat may be applied to the layer to fuse the fusing agent area while sintering the gap area.

In examples where the fusing agent comprises black ink (e.g. carbon black) and the build material comprises white powder, a black fusing agent may be applied to a white build material. In these examples, when the black fusing agent is applied according to the fusing agent pattern to the white build material the parts of the white build material that correspond to the object pattern (e.g. the gap area) will themselves be white (since no black fusing agent is applied to the white build material) while surrounding areas (fusing agent areas where black fusing agent is applied to the white build material) will be black. In these examples, when energy is applied to the layer to heat and fuse the layer, the build material comprising fusing agent will heat and fuse while the build material with no fusing agent (corresponding to the gap area and the object pattern) will fuse by thermal bleed from the fused build material that comprised fusing agent, and the resulting object in these examples will therefore have the object pattern formed in white in part of the object, as no fusing agent was applied to parts of the build material that corresponded to the object pattern. The object pattern in these examples will therefore be formed in part of the object and will be of substantially the same colour as the colour of the build material. The surrounding areas (e.g. the areas of the object surrounding the object pattern which corresponded to parts of the build material to which fusing agent was applied) will, in these examples, be darker (e.g. black) in appearance.

In some examples, determining object generation instructions may comprise applying halftoning to voxels associated with object generation parameters to determine object generation or print instructions for the layer. Halftoning may result in the selection of a particular print agent in a particular location. For example, an object generation parameter may specify an area coverage or contone level for a print agent. A halftoning screen or instructions may be used to make selections of locations and amounts of print agents to be placed to produce an intended result (which may be fusion of build material in a simple example, but which may comprise color, transparency, conductivity, density and the like in other examples), for example based on the area coverage. While halftoning is used in this example, in other examples, other techniques may be used. For example, if using piezo printheads, a drop volume could be directly specified. If the additive manufacturing technique is or includes a selective laser sintering technique, the method may comprise specifying a power level of a laser.

In one example, block 106 may comprise generating a contone map describing an amount of fusing agent to be applied to areas of build material according to the object pattern described by the pattern data. For example, block 106 may comprise generating a fusing agent contone map that describes an amount of fusing agent to be applied to the fusing agent area of the pattern, e.g. an amount of fusing agent to be applied to an area of a layer of build material corresponding to a voxel of a corresponding slice of the object. In these examples, the area of the layer of build material may correspond to a voxel in a slice of the object that surrounds the object pattern in the object. In these examples, block 106, may comprise generating a fusing agent contone map describing a number of drops of fusing agent to be applied to a region of an area of a layer of build material corresponding to a voxel of a corresponding slice of an object. In some examples, the method 100 may (e.g. in block 106) comprise modifying the object model data to account for the pattern data (e.g. integrating the pattern data determined at block 104 with the object model data determined at block 102) and then block 106 may comprise generating a contone map to apply fusing agent according to the pattern of fusing agent.

For example, block 102 may comprise determining object model data, and block 104 may comprise determining pattern data and modifying the object model data to include the pattern data (e.g. by integrating the object model data with the pattern data) and then operating (e.g. obtaining, receiving or determining) the modified patterned object data. Block 106 in this example may then comprise determining control data to apply fusing agent according to the pattern data which is integrated with the object model data.

Operating, at block 102 of the method 100, may comprise obtaining, receiving, or determining, by a processor, the object model data. Operating, at block 102, may comprise preparing the object model data for printing, for example the object model data may be inputted by a user. In another example the object model data may be sent, e.g. from a device, and block 102 may comprise receiving the data to be subsequently prepared for printing. Operating, at block 104 of the method 100, may comprise obtaining, receiving, or determining, by a processor, the pattern data. In one example, the object model data may comprise the pattern data, and blocks 102 and 104 may be concurrently performed, e.g. the object model data comprising the pattern data may be received by a processor and/or inputted by a user. In one example, operating at block 102 on the object model data may cause the pattern data to be determined at block 104. Accordingly, in one example block 102 may comprise determining the object model data. In one example block 104 may comprise determining the pattern data. As will be described below with reference to the example of FIG. 2, a unique identifier may be operated on to generate the pattern data and/or the object data.

The location of the object pattern in the object may be described by the object model data and/or the pattern data and/or the unique identifier.

Therefore, in one example the method 100 comprises operating on a unique identifier associated with the pattern data. For example, a unique identifier may be assigned to the pattern data and the method 100 may comprise receiving the unique identifier, or determining the unique identifier from the object model data, and determining the pattern data from the unique identifier.

In some examples, block 106 may comprise determining, by a processor, control data to apply a detailing agent to at least a part of a layer of build material corresponding to a portion of the object. The control data may be to not apply detailing agent to a part of the build material corresponding to a boundary of the gap area, or to a part of the build material corresponding to an interface between the fusing agent area and the gap area, since the application of detailing agent to these areas may reduce the amount of thermal bleed to the parts of the build material corresponding to the gap area.

The method of FIG. 1 therefore allows an object pattern to be formed in part of an object to be generated in additive manufacturing having substantially the same colour as the colour of build material used to generate the object, since no fusing agent is applied to parts of the build material corresponding to the object pattern (e.g. the gap area). Additionally, the patterned area in the object generated according to the method 100 (to which no fusing agent was applied in the manufacturing) will be fused by the thermal bleed from the surrounding areas of build material (to which fusing agent was applied) when heat was applied during manufacturing to the build material to fuse the layers of build material. Therefore, once the build material is heated to generate the object, the gap areas which have had no fusing agent applied will become the object pattern in the generated object.

Figure 2:
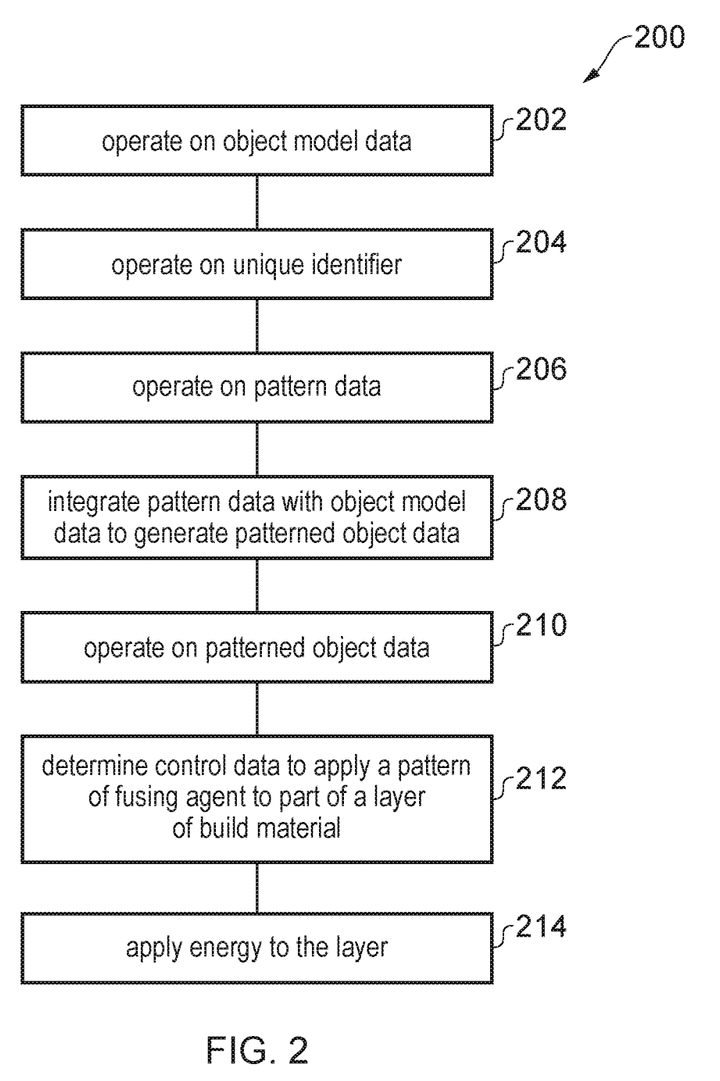
FIG. 2 is a flowchart of an example method of generating an object.

FIG. 2 is an example of a method 200, which may comprise a computer implemented method, and/or which may comprise a method of determining object generation instructions for generating at least one object layer by additive manufacturing and/or may comprise a method of additive manufacturing or for generating an object (e.g. a three-dimensional object) by additive manufacturing. The method 200 comprises, in block 202, operating on, by a processor, object model data for example as described above in relation to block 104 of method 100.

At block 204 the method 200 comprises operating on a unique identifier. At block 206 the method 200 comprises operating on pattern data, for example, as described above in relation to block 104 of method 100. The unique identifier is associated with the pattern data. In one example, the object model data comprises the unique identifier and operating at block 202 on the object model data may cause the unique identifier to be retrieved and/or generated. In another example, operating, at block 204, comprises obtaining and/or receiving the unique identifier. Block 204 in one example may comprise generating the unique identifier. In one example block 204 may comprise determining the pattern data from the unique identifier and block 206 may comprise receiving the pattern data, determined from the unique identifier at block 204. In another example, block 202 may comprise preparing the object model data for printing, block 204 may comprise retrieving the unique identifier from the object model data and block 206 may comprise retrieving the pattern data from the unique identifier. The unique identifier may, in some examples, comprise a number.

The method 200 comprises at block 208 integrating the pattern data with the object model data to generate patterned object data. Accordingly, in this example the patterned object data comprises the object model data modified according to the pattern data. For example, the object model data may be a sphere and the pattern data may be a logo intended to be formed in the external surface of the object. Block 206 in this example may comprise modifying the sphere to include the logo in its external surface (at a location determined by the object model data and/or the pattern data).

Block 210 of the method 200 may comprise operating on the patterned object data. Operating at block 210 may comprise obtaining, receiving or determining the patterned object data. According to the example above, where the object model data (the sphere) is integrated with the pattern data (the logo) the patterned object data is the sphere modified with the logo. Accordingly, block 210 may comprise receiving the "modified sphere". Therefore, block 210 may comprise receiving, at an apparatus for additive manufacturing, the object to be generated and the object pattern to be formed on the object.

Block 212 of the method 200 comprises determining, by a processor, control data to control a print agent applicator to apply a pattern of fusing agent (FA) onto a part of a layer of build material. The pattern of fusing agent comprises a fusing agent area and a gap area that lacks fusing agent. The gap area corresponds to the object pattern such that no fusing agent is applied to a part of the layer of build material that corresponds to the object pattern. Therefore, the control data is to apply a pattern of fusing agent such that no fusing agent is applied to areas of build material corresponding to the object pattern integrated in the modified object data, but fusing agent is applied to areas of build material that do not correspond to the object pattern.

In examples where the fusing agent comprises black ink (e.g. carbon black) and the build material comprises white powder, a black fusing agent may be applied to a white build material. In these examples, when the black fusing agent is applied according to the fusing agent pattern to the white build material the parts of the white build material that correspond to the object pattern (e.g. the gap area) will themselves be white (since no black fusing agent is applied to the white build material) while surrounding areas (fusing agent areas where black fusing agent is applied to the white build material) will be black. In these examples, when energy is applied to the layer to heat and fuse the layer, the build material comprising fusing agent will heat and fuse while the build material with no fusing agent (corresponding to the gap area and the object pattern) will fuse by thermal bleed from the fused build material that comprised fusing agent. The resulting object in these examples therefore will have the object pattern formed in part of the object but will be white in appearance, as no fusing agent was applied to parts of the build material that corresponded to the object pattern. The object pattern in these examples will therefore be formed in part of the object and will be of substantially the same colour as the colour of the build material. The surrounding areas (e.g. the areas of the object surrounding the object pattern which corresponded to parts of the build material to which fusing agent was applied) will, in these examples, be darker (e.g. black) in appearance.

In one example, block 212 may comprise generating a contone map describing an amount of fusing agent to be applied to areas of build material according to the object pattern described by the pattern data. For example, block 212 may comprise generating a fusing agent contone map that describes an amount of fusing agent to be applied to the fusing agent area of the pattern, for example an amount of fusing agent to be applied to an area of a layer of build material corresponding to a voxel of a corresponding slice of the object. In these examples, the area of the layer of build material may correspond to a voxel in a slice of the object that surrounds the object pattern in the object. In these examples, block 212, may comprise generating a fusing agent contone map describing a number of drops of fusing agent to be applied to a region of an area of a layer of build material corresponding to a voxel of a corresponding slice of an object.

The object pattern described by the pattern data may comprise an identification code, text, logo, graphic, picture, wear indicator, or any combination thereof.

As described above with reference to the example of FIG. 1, the object pattern may be intended to be formed on at least an exterior surface, or boundary, of (a slice of) the object to be generated in additive manufacturing, or the object pattern may be intended to be formed on at least an internal region of (a slice of) the object to be generated in additive manufacturing. The pattern data may therefore describe an object pattern intended to be formed on an external surface of the object or an internal portion of the object. The patterned data, operated on at block 210, may therefore comprise the object pattern in an internal portion and/or an external surface of the object. The control data, determined at block 212, may be to control the print agent applicator to apply the pattern of fusing agent onto a part of a layer of build material corresponding to an external surface and/or an internal portion of the object, depending on the location of the object pattern in/on the object to be generated. The location of the object pattern may be described by the object model data and/or the pattern data, and/or the unique identifier. The modified object data may describe an object pattern intended to be formed on at least two slices of the object described by the object model data, e.g. may span two slices. The object pattern may describe a first sub-pattern and a second sub-pattern. In one example, the first sub-pattern may be intended to be formed on a first slice of the object and the second sub-pattern may be intended to be formed on a second slice of the object. In another example, the first and second sub-patterns may each intended to be formed on first and second slices of the object. In examples where the object pattern describes a wear indicator the sub-patterns may be, for example, patterns of different area, concentric circles etc. Therefore, the object pattern described by the pattern data may be intended to be formed in a single slice of the object, or may span multiple slices of the object. In each case, the fusing agent may be applied according to the pattern on a single layer of build material or multiple slices of build material, respectively, and according to the control data determined at block 212.

Block 212 may comprise determining, by a processor, control data to apply a detailing agent to at least a part of a layer of build material corresponding to a portion of the object, for example as described above with reference to block 106 of method 100.

Block 214 comprises applying energy (e.g. heat) to (the part of) the layer of build material to which the pattern of fusing agent was applied to fuse the parts of the layer to which fusing agent was applied while sintering the parts of the layer to which no fusing agent was applied (e.g. the parts of the build material corresponding to the gap area) by thermal bleeding from the surrounding areas of the build material that comprise fusing agent. In other words, at block 214, heat may be applied to the layer to fuse the fusing agent area while sintering the gap area.

Block 214 may comprise printing (or generating) the object using the object generation instructions. For example, this may comprise forming a layer of build material, applying print agents, for example through use of 'inkjet' liquid distribution technologies, in location specified in the object generation instructions for an object model slice corresponding to that layer, and applying energy, for example heat, to the layer. Some techniques allow for accurate placement of print agent on a build material, for example by using print heads operated according to inkjet principles of two-dimensional printing to apply print agents, which in some examples may be controlled to apply print agents with a resolution of around 600 dpi, or 1200 dpi. A further layer of build material may then be formed and the process repeated, with the object generation instructions for the next slice.

In some examples, blocks 202 to 212 may be carried out at least partially concurrently with object generation in block 214. As the processes of blocks 202 to 212 can be relatively resource heavy in terms of processing power and memory storage, this may make efficient use of the resources available.

The method 200 of FIG. 2 therefore allows an object pattern to be formed in part of an object to be generated in additive manufacturing having substantially the same colour as the colour of build material used to generate the object, since no fusing agent is applied to parts of the build material corresponding to the object pattern (e.g. the gap area). Additionally, the patterned area in the object generated according to the method 200 (to which no fusing agent was applied in the manufacturing) will be fused by the thermal bleed from the surrounding areas of build material (to which fusing agent was applied) when heat was applied during manufacturing to the build material to fuse the layers of build material. Therefore, once the build material is heated to generate the object, the gap areas which have had no fusing agent applied will become the object pattern in the generated object.

Figure 3:
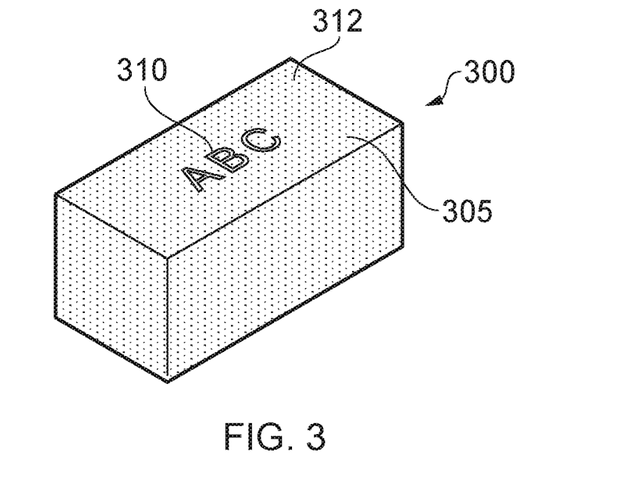
FIG. 3 is an example of a three-dimensional printed object.

FIG. 3 shows an example of a three-dimensional printed object 300, in this example a cuboid, which shows an intended placement of an object pattern 310 formed in an external surface 310 of the object 310.

In some examples, the object 300 may be manufactured using the methods 100 or 200 of FIG. 1 or FIG. 2, respectively. In such examples, when fusing agent was applied to areas of layers of build material according to the fusing agent pattern, no fusing agent was applied to areas of the build material corresponding to the object pattern (e.g. the gap areas). Accordingly, the colour of the object pattern 310 formed in the object 310 is substantially the same colour as the colour of the build material used to generate the object 310, since this will have no fusing agent remnant. In this example, a coloured fusing agent is applied to a white (or light-coloured) build material. Therefore, the colour of the surrounding areas 312 (e.g. the areas surrounding the object pattern) are darker in colour as they have fusing agent remnant following evaporation of the solvent from the applied fusing agent.

Therefore, when the object 300 is manufactured using then method 100 or 200, the object pattern described by the pattern data is intended to be formed in an external surface 305 of the object 300 described by the object model data.

Figure 4:
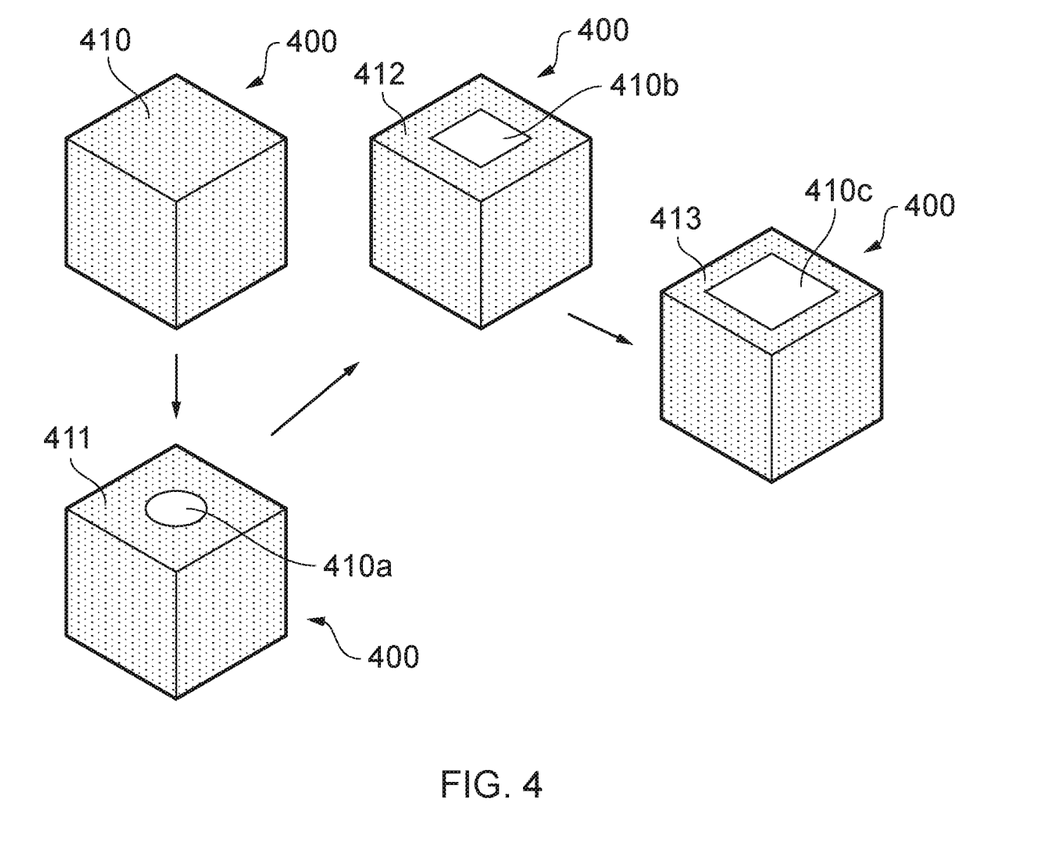
FIG. 4 is an example of a three-dimensional printed object.

FIG. 4 shows various cross-sectional views through a three-dimensional printed object 400, in this example a cuboid, comprising an object pattern comprising object pattern parts 410a, 410b, 410c each formed on an internal portion of the object 400. In the example shown in FIG. 4 the object pattern comprises a wear indicator, and the arrows in FIG. 4 denote the object 400 in various stages of wear. In this example, the first part 410a of the object pattern is a pattern of a first area. The second part 410b is a pattern of a second area and the third part 410c is a pattern of a third area. The first area is less than the second area which is less than the third area. The object 400 comprises an external surface 410.

Each of the three pattern parts 410a-c are formed on an internal portion of the object 400. As shown in FIG. 4, the object 400 comprises three portions 411, 412 and 413. The first portion 411 is revealed when the external surface 410 has worn away, eroded or deformed etc. Therefore, at least a part of the first portion 411 is internal to the object (relative to the external surface 410) (they may of course share a boundary, e.g. at their edges). The second portion 412 is revealed when the first portion 411 has worn away, eroded or deformed etc. Therefore, at least a part of the second portion 412 is internal to the object and closer to a centre of the object than a corresponding part of the first portion 411. The first portion 413 is revealed when the second portion 412 has worn away, eroded or deformed etc. Therefore, at least a part of the third portion 413 is internal to the object and closer to a centre of the object than a corresponding part of the second portion 412.

For example, a respective part of each of the three portions 411-413 may represent three spatial shells each representing a corresponding level or layer of the region of the object 400. The shells may have any shape, and do not necessarily conform to the shape of the outer profile of the object 400. For example, the three portions 411-413 may be a sequence of shells nested within the external surface 410 of the object 400. They may be at different locations of the object 400 or, as shown in the FIG. 4 example, at different depths. Each portion 411-413 therefore represents a respective different level (e.g. a level of depth) of the object 400. Each portion 411-413 may represent a different level of the object (e.g. first portion 411 may represent a first level, etc.) with the first level 411 being the level that is closest to the outer surface 410 of the object 400 and/or farthest away from a centre of the object 400, and the third level 413 being the level that is farthest away from the outer surface 410. The portions 411, 412 and 413 may represent respective portions of the object 400 at increasing depths into the object or, equivalently, at increasing distances from the outer surface 410 of the object 400. Erosion of the outer surface 410 may expose the first portion or level 411. Erosion of the first portion or level 411 may expose the second portion or second level 412. Erosion of the second portion or level 412 may expose the third portion or third level 413.

Therefore, the wear indicator pattern comprising first, second, and third parts 410a, 410b, and 410c is progressively exposed as the object 400 erodes or wears away. As the object 400 wears away to progressively expose the first, second and third internal portions 411, 412, 413 of the object 400, the first, second and third object parts 410a, 410b, 410c are exposed. Therefore, as the object 400 progressively erodes or wears away, the object pattern parts of increasing area are progressively exposed. In this way a user may visually identify the age of the part based on the area of the part of the object pattern exposed.

In some examples, the object 400 may be manufactured using the methods 100 or 200 of FIG. 1 or FIG. 2, respectively. In such examples, when fusing agent was applied to areas of layers of build material according to the fusing agent pattern, no fusing agent was applied to areas of the build material corresponding to the object pattern (e.g. the gap areas). Accordingly, the colour of each object pattern part 410a-c formed in a respective internal part 411-413 of the object 400 are each substantially the same colour as the colour of the build material used to generate the object 400, since this will have no fusing agent remnant. In this example, a coloured fusing agent is applied to a white (or light-coloured) build material. Therefore, the colour of the surrounding areas (e.g. the areas surrounding the object pattern parts 411-413) are darker in colour as they have fusing agent remnant following evaporation of the solvent from the applied fusing agent.

Therefore, when the object 400 is manufactured using the method 100 or 200, the object pattern described by the pattern data is intended to be formed in an internal portion 411, 412, 413 of the object 400 described by the object model data. In the example of FIG. 4, the object pattern may be intended to be formed on a plurality of slices of the object 400. For example, each portion 411, 412, 413 may be a part of a respective slice of the object (e.g. a solidified layer of build material) or may comprise part of a plurality of slices. In the latter case, when generating the object 400 fusing agent may be applied according to the fusing agent pattern onto to respective parts of a plurality of different layers of build material.

Figure 5:
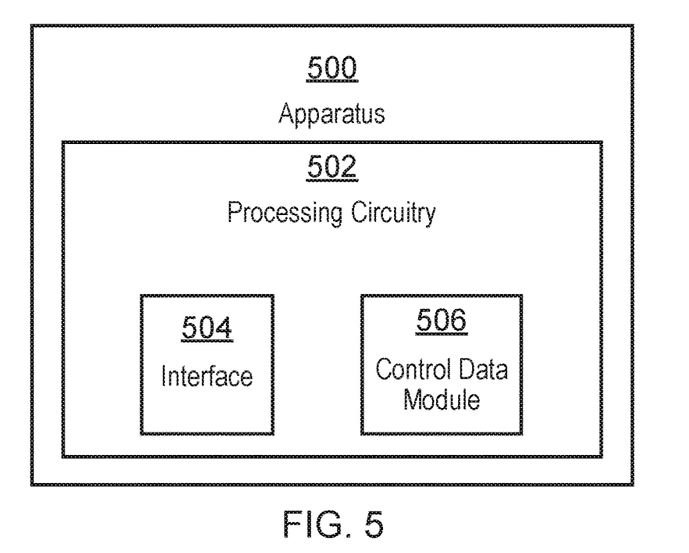
FIG. 5 is a simplified schematic drawing of an example apparatus for additive manufacturing.

FIG. 5 shows an apparatus 500 comprising processing circuitry 502. The processing circuitry 502 comprises an interface 502 and a control data module 504.

The interface 502 is to operate on object model data and pattern data, the object model data describing at least part of an object to be generated in additive manufacturing and the pattern data describing an object pattern intended to be formed on at least a portion of the part of the object. The control data module 504 is to generate control data to control a 3D printer to generate the object by selectively fusing successive layers of build material, and wherein the control data is to control a print agent applicator to apply a pattern of fusing agent onto a part of a layer of build material, the pattern of fusing agent comprising a fusing agent area and a gap area that lacks fusing agent, wherein the gap area corresponds to the object pattern such that no fusing agent is applied to a part of the layer of build material that corresponds to the object pattern.

In one example the control data is to generate a contone map describing an amount of fusing agent to be applied to areas of build material according to the object pattern described by the pattern data. In one example the interface is to operate on a unique identifier being associated with the pattern data, to determine the pattern data.

The object pattern described by the pattern data may comprise an identification code, text, logo, graphic, picture, wear indicator, or any combination thereof, as described above.

Figure 6:
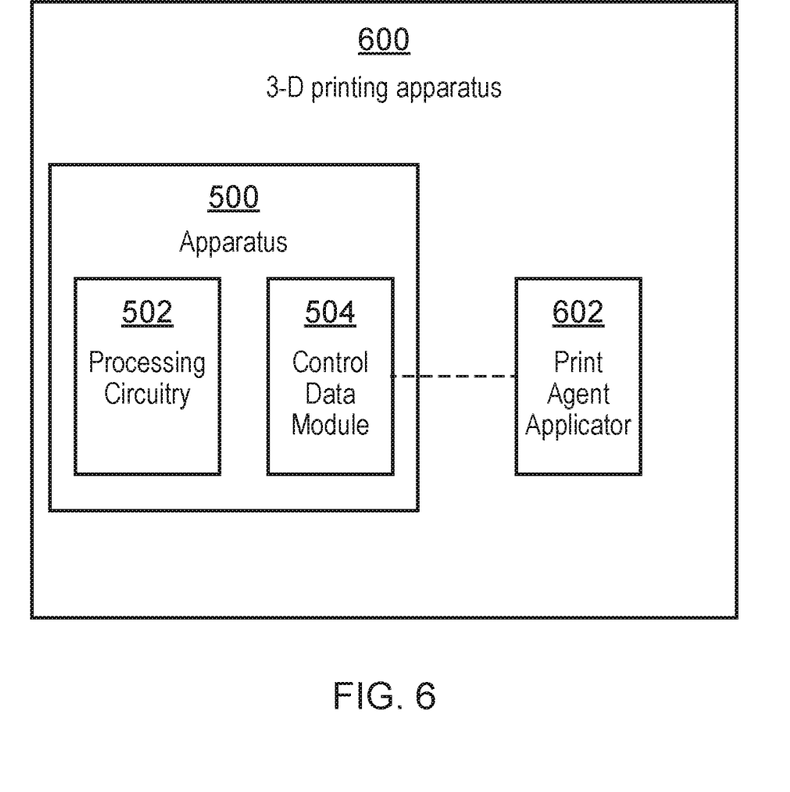
FIG. 6 is an example of a machine-readable medium in association with a processor.

FIG. 6 shows an example of 3-D printing apparatus 600. The 3-D printing apparatus 600 comprises the apparatus 500 of FIG. 5. 3-D printing apparatus 600 comprises a print agent applicator 602. The print agent applicator 602 is to apply, under control of the control data generated by the control data module fusing agent to an area of build material according to the fusing agent pattern. Therefore, the print agent applicator 602 is to apply, under control of the control data, no fusing agent to areas of build material that correspond to the gap region, and fusing agent to surrounding areas of build material.

In some examples, the 3-D printing apparatus 600 may operate under the control of control data generated based on the print instructions to generate at least one object in a plurality of layers according to the generated control data/print instructions. The 3-D printing apparatus 600 may generate an object in layer-wise manner by selectively solidifying portions of layers of build materials. The selective solidification may in some examples be achieved by selectively applying print agents, for example through use of 'inkjet' liquid distribution technologies, and applying energy, for example heat, to the layer. The 3-D printing apparatus 600 may comprise additional components not shown herein, for example a fabrication chamber, a print bed, print head(s) for distributing print agents, a build material distribution system for providing layers of build material, energy sources such as heat lamps and the like, which are not described in detail herein.

The processing circuitry 502, and/or the 3-D printing apparatus 600 may carry out any or any combination of the blocks of the methods 100 and/or 200 shown in FIG. 1 or FIG. 2, respectively. The apparatus 500 or the apparatus 600 may be to manufacture the object 300 or the object 400 as shown in FIGS. 3 and 4, respectively.

Figure 7:
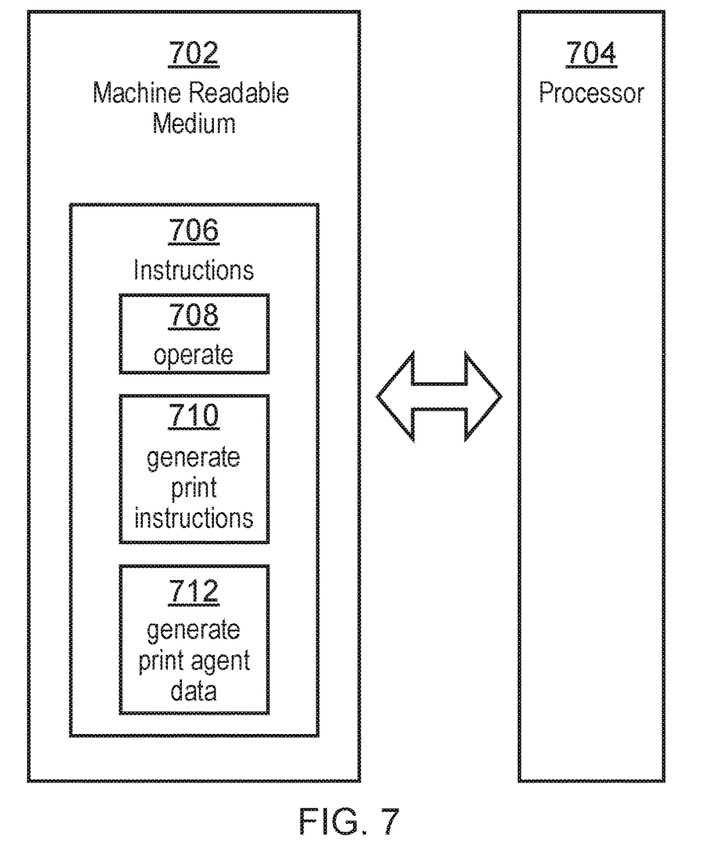
FIG. 7 is an example tangible (and non-transitory) machine-readable medium in association with a processor.

FIG. 7 shows an example tangible (and non-transitory) machine-readable medium 702 in association with a processor 704. The tangible machine-readable medium 702 comprises instructions 706 which, when executed by the processor 704, cause the processor 704 to carry out a plurality of tasks. The instructions 706 comprise instructions 708 to operate on machine-readable object model data describing an object to be manufactured and machine-readable pattern data describing a pattern intended to be formed on a portion of the object to be manufactured. The instructions 706 comprise instructions 710 to generate print instructions for generating the object described by the machine-readable object model data. The instructions 706 comprise instructions 712 to generate print agent data to cause no fusing agent to be applied to a region of build material corresponding to the pattern described by the machine-readable pattern data.

In one example, the instructions 706 may comprise instructions to generate a contone map describing an amount of fusing agent to be applied to areas of build material according to the pattern described by the machine-readable pattern data.

The instructions 706 may comprise instructions to operate on a unique identifier associated with the machine-readable pattern data. The instructions 708 to operate on the machine-readable object model data and the machine-readable pattern data may comprise instructions to obtain, receive, determine and/or generate the machine-readable object model data and/or the machine-readable pattern data. The instructions 706 may comprise instructions to integrate or modify the machine-readable object model data with the machine-readable pattern data.

The machine-readable medium 702 may comprise instructions to perform any, or a combination of, the blocks of the methods 100 or 200 as set out in FIG. 1 or 2, respectively; and/or to provide the interface 502 and/or the control data module 504 of the examples of FIG. 5 or 6.

Some examples herein relate to producing a pattern on an object having the same, or substantially similar, colour as the build material used to generate that object, since the parts of build material corresponding to the pattern are not inked with a fusing agent. Those parts of the build material may be thin enough to still be fully fused by thermal bleed from the surrounding areas that are inked with fusing agent. As a result, the pattern (which, as above, may in some examples be a wear indicator) has the intrinsic colour of the build material, whereas the rest of the object has the colour of the fusing agent. This resulting colour contrast is able to provide a good visual indication of the pattern (and in examples where the pattern is a wear indicator, geometric wear), and because the (non-inked) patterned parts of the object are fully fused, the properties of the object are not affected. Some examples herein are therefore able to produce a colour contrast without requiring multi-colour printing or using multiple materials (e.g. without requiring the use of a coating or a binder), without affecting the mechanical or thermal properties of the object, or additional time and cost.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks the flow charts and/or block diagrams, can be realized using machine-readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus (such as the feasibility assessment module 504 and/or the print instructions module 506) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing device(s), so that the computer or other programmable data processing device(s) perform a series of operations to produce computer-implemented processing, thus the instructions executed on the computer or other programmable devices realize functions specified by block(s) in the flow charts and/or the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    operating, by a processor, on object model data, the object model data describing at least part of an object to be generated in additive manufacturing;
    operating, by the processor, on pattern data describing an object pattern intended to be formed on at least a portion of the part of the object to be generated in additive manufacturing, wherein the object pattern comprises a shape, wherein the shape comprises a series of shapes that are gradually larger starting from an exterior surface of the object to internal layers of the object to form a wear indicator pattern; and
    determining, by the processor, control data to control a print agent applicator to apply a pattern of fusing agent onto a part of a layer of build material, the pattern of fusing agent comprising a fusing agent area and a gap area that lacks fusing agent, wherein the gap area corresponds to the object pattern such that no fusing agent is applied to a part of the layer of build material that corresponds to the object pattern, wherein the build material in the gap area is fused by thermal bleed from the fusing agent area that surrounds the build material in the gap area such that a color of the build material of the object pattern in the gap area is different than a color of the build material in the fusing agent area.

2. The method according to claim 1, wherein determining the control data comprises generating a contone map describing an amount of fusing agent to be applied to areas of build material according to the object pattern described by the pattern data.

3. The method according to claim 1, further comprising:
    operating, by the processor, on patterned object data, the patterned object data comprising the object model data modified according to the pattern data.

4. The method according to claim 3, further comprising:
    integrating the pattern data with the object data to generate the patterned object data.

5. The method according to claim 1 wherein the pattern data describes the object pattern intended to be formed on an external surface of the object, and wherein the control data is to control the print agent applicator to apply the pattern of fusing agent onto a part of a layer of build material corresponding to the external surface of the object.

6. The method according to claim 1, wherein the pattern data describes the object pattern intended to be formed on at least an internal portion of the object, wherein the control data is to control the print agent applicator to apply the pattern of fusing agent onto a part of a layer of build material corresponding to the internal portion of the object.

7. The method according to claim 1, wherein the pattern data describes the object pattern intended to be formed on a first part of a first slice of the object, the first part being part of an internal portion of the object and a second part of a second slice of the object, the second part being another part of the internal portion of the object wherein the control data is to control the print agent applicator to apply the pattern of fusing agent onto a part of a layer of build material corresponding to the internal portion of the object.

8. The method according to claim 1, further comprising:
    operating, by a processor, on a unique identifier, the unique identifier being associated with the pattern data, to determine the pattern data.

9. The method according to claim 1, further comprising applying energy to the part of the layer of build material comprising the pattern of fusing agent to fuse the parts of the layer comprising fusing agent while sintering the gap area by thermal bleeding from the parts of the layer comprising fusing agent.

10. An apparatus comprising:
    processing circuitry, wherein the processing circuitry comprises:
    an interface to operate on object model data and pattern data, the object model data describing at least part of an object to be generated in additive manufacturing and the pattern data describing an object pattern intended to be formed on at least a portion of the part of the object, wherein the object pattern comprises a shape, wherein the shape comprises a series of shapes that are gradually larger starting from an exterior surface of the object to internal layers of the object to form a wear indicator pattern; and
    a control data module to generate control data to control a 3D printer to generate the object by selectively fusing successive layers of build material, and wherein the control data is to control a print agent applicator to apply a pattern of fusing agent onto a part of a layer of build material, the pattern of fusing agent comprising a fusing agent area and a gap area that lacks fusing agent, wherein the gap area corresponds to the object pattern such that no fusing agent is applied to a part of the layer of build material that corresponds to the object pattern, wherein the build material in the gap area is fused by thermal bleed from the fusing agent area that surrounds the build material in the gap area such that a color of the build material of the object pattern in the gap area is different than a color of the build material in the fusing agent area.

11. The apparatus according to claim 10, wherein the control data is to generate a contone map describing an amount of fusing agent to be applied to areas of build material according to the object pattern described by the pattern data.

12. The apparatus according to claim 10, wherein the interface is to operate on a unique identifier being associated with the pattern data, to determine the pattern data.

13. The apparatus according to claim 10 which comprises a 3D printing apparatus.

14. A non-transitory computer-readable storage medium comprising a set of computer-readable instructions stored thereon, which, when executed by a processor of a printing system cause the processor to:
    operate on machine-readable object model data describing an object to be manufactured and machine-readable pattern data describing a pattern intended to be formed on a portion of the object to be manufactured, wherein the pattern comprises a shape, wherein the shape comprises a series of shapes that are gradually larger starting from an exterior surface of the object to internal layers of the object to form a wear indicator pattern;
    generate print instructions for generating the object; and
    generate print agent data to cause no fusing agent to be applied to a region of build material corresponding to the pattern described by the machine-readable pattern data, wherein the region of build material with no fusing agent is fused by thermal bleed from an area of build material with a fusing agent that surrounds the region of build material with no fusing agent such that a color of the region of build material with no fusing agent is different than a color of the area of build material with the fusing agent.

15. The non-transitory computer-readable storage medium according to claim 14 wherein the instructions, when executed by the processor, cause the processor to:
generate a contone map describing an amount of the fusing agent to be applied to areas of build material according to the pattern described by the machine-readable pattern data.

16. A method comprising:
operating, by a processor, on object model data, the object model data describing at least part of an object to be generated in additive manufacturing;
operating, by the processor, on pattern data describing an object pattern intended to be formed on a plurality of internal layers of the object via an additive manufacturing process, wherein the object pattern comprises a series of shapes that are gradually larger on the plurality of internal layers of the object towards the exterior surface of the object to form a wear indicator pattern; and
determining, by the processor, control data to control a print agent applicator to apply a pattern of fusing agent onto a part of a layer of build material, the pattern of fusing agent comprising a fusing agent area and a gap area that lacks fusing agent, wherein the gap area corresponds to the object pattern such that no fusing agent is applied to a part of the layer of build material that corresponds to the object pattern, wherein the build material in the gap area is fused by thermal bleed from the fusing agent area that surrounds the build material in the gap area such that a color of the build material of the object pattern in the gap area is different than a color of the build material in the fusing agent area.

* * * * *